United States Patent
Wang et al.

(10) Patent No.: US 7,872,842 B2
(45) Date of Patent: Jan. 18, 2011

(54) OVERCURRENT PROTECTION DEVICE FOR A POWER SUPPLY DEVICE AND RELATED POWER SUPPLY DEVICE

(75) Inventors: Yen-Hui Wang, Hsinchu (TW); Chi-Hao Wu, Taipei (TW); Chia-Chieh Hung, Taoyuan County (TW); Chin-Yen Lin, Hsinchu County (TW)

(73) Assignee: Grenergy Opto, Inc., Hsin-Chu (TW)

( * ) Notice: Subject to any disclaimer, the term of this patent is extended or adjusted under 35 U.S.C. 154(b) by 123 days.

(21) Appl. No.: 12/275,175

(22) Filed: Nov. 20, 2008

(65) Prior Publication Data

US 2010/0123988 A1    May 20, 2010

(51) Int. Cl.
*H02H 7/00* (2006.01)
(52) U.S. Cl. ........................................ 361/93.9; 361/18
(58) Field of Classification Search ................... 361/18, 361/93.7–93.9
See application file for complete search history.

(56) References Cited

U.S. PATENT DOCUMENTS 7,643,313 B2 * 1/2010 Lin .............................. 363/20

2004/0021992 A1 * 2/2004 Takamatsu ................... 361/18
2005/0135036 A1 * 6/2005 Kanamori et al. .......... 361/93.1

FOREIGN PATENT DOCUMENTS

CN    1630175 A    6/2005

* cited by examiner

*Primary Examiner*—Danny Nguyen
(74) *Attorney, Agent, or Firm*—Winston Hsu; Scott Margo

(57) ABSTRACT

An overcurrent protection device for a power supply device includes a receiving end for receiving a current sensing signal, a compensating current unit coupled to the receiving end for compensating the current sensing signal in order to generate a current sense compensation signal, a first reference voltage generator for generating a first reference voltage, a comparator coupled between the compensating current unit and the first reference voltage generator for comparing the current sense compensation signal with the first reference voltage in order to generate a comparison result, a control unit coupled to the comparator for controlling a power switch of the power supply device according to the comparison result.

12 Claims, 7 Drawing Sheets

OVERCURRENT PROTECTION DEVICE FOR A POWER SUPPLY DEVICE AND RELATED POWER SUPPLY DEVICE

BACKGROUND OF THE INVENTION

1. Field of the Invention

The present invention relates to an overcurrent protection device for a power supply device and related power supply device, and more particularly, to an overcurrent protection device and related power supply device capable of achieving an identical voltage for the overcurrent limit corresponding to each input voltage.

2. Description of the Prior Art

Power supplies are utilized for supplying electrical energy for electronic devices, and can be generally divided into linear power supplies and switching power supplies. Compared to the linear power supplies, the switching power supplies have advantages of smaller size, lighter weight, and greater efficiency, so as to be widely applied to different areas, such as mobile communication devices, personal digital assistants, computers and related peripheral devices, servers, and network devices.

Protection schemes, such as overvoltage protection, overcurrent protection, or overpower protection, etc., play a very important role in a control circuit of a power supply for safe operation of the power supply. Power supplies that have comprehensive protection schemes can prevent internal elements and related devices from being damaged under current overload or short circuit conditions.

Please refer to FIG. 1. FIG. 1 is a schematic diagram of a power supply 100 in the prior art. The power supply 100 includes a transformer 102, a power switch 104, a current sensing unit 106, a comparator 108, and a pulse width modulation control unit 110. The transformer 102 includes a primary side circuit $L_1$ and a secondary side circuit $L_2$ for transforming an input signal $V_{IN}$ into an output signal $V_{OUT}$. The power switch 104 is coupled to the primary side circuit $L_1$ for controlling operations of the transformer 102. As shown in FIG. 1, the power switch 104 is implemented by a power transistor Q1. The pulse width modulation control unit 110 is utilized for controlling on/off status of the power switch 104 by outputting a control signal. The current sensing unit 106 is coupled to the drain of the power transistor Q1, and implemented by a current sensing resistor $R_{CS}$ for providing a current sensing signal $V_{CS}$ in order to detect current $I_{L1}$ passing through the primary side circuit of the power transistor Q1. The comparator 108 is utilized for comparing the current sense signal $V_{CS}$ with a reference voltage $V_{REF}$ in order to provide a result for the pulse width modulation control unit 110 to determine whether the overcurrent condition exists. For example, when the current sensing signal $V_{CS}$ is greater than the reference voltage $V_{REF}$, the comparator 108 can pass an indication signal $S_{OC}$ to the pulse width modulation control unit 110. The pulse width modulation control unit 110 then enables to turn off the power transistor Q1 in order to reduce the current $I_{L1}$ passing through the primary side circuit.

The above protection scheme can keep the current within a proper range by comparing the current sensing signal $V_{CS}$ with the reference voltage $V_{REF}$. However, when the current sensing signal $V_{CS}$ is greater than the reference voltage $V_{REF}$, the power switch 104 can not turn off immediately due to non-ideal factors. Actually, the pulse width modulation control unit 110 may enable to turn off the power switch 104 after a non-ideal delay. As a result, since the overcurrent condition exists until the power switch 104 actually turns off, there exists a propagation delay time $T_{delay}$ in which the current will be greater than a predetermined value. In other words, a voltage of actual initial overcurrent protection (protection voltage) is usually greater than a voltage corresponding to occurrence of the overcurrent condition (i.e. $V_{REF}$), and the protection voltages will be different for each input voltage $V_{IN}$.

In detail, FIG. 2 is a schematic diagram of protection voltage difference for different input voltages due to propagation delay. The input signal $V_{IN}$ of the power supply 100 is proportional to the rising slope of the current sensing signal $V_{CS}$. Therefore, a high input voltage $V_H$ will generate a current sensing signal with greater slope and a low input voltage $V_L$ will generate a current sensing signal with less slope. The reference voltage is $V_{REF}$. Moreover, there is a same propagation delay time $T_{delay}$ in the same power supply. The propagation delay time $T_{delay}$ is irrelevant to the input signal $V_{IN}$. As shown is FIG. 2, as the current sensing signal $V_{CS}$ rises to a power limit level of the reference voltage $V_{REF}$, the comparator 108 passes an indication signal $S_{OC}$ to the pulse width modulation control unit 110 so as to turn off the power transistor Q1. After a propagation delay time $T_{delay}$ during which the power switch 104 is turned off, the current $I_{L1}$ passing through the primary side circuit is disabled. As shown in FIG. 2, since the overcurrent condition exists until the power switch 104 actually turns off, the input signal continues to provide power, so that the high input voltage $V_H$ has a corresponding protection voltage $V_{OPPH}$ and the low input voltage $V_L$ has a corresponding protection voltage $V_{OPPL}$. Therefore, the protection voltage will greater than the reference voltage $V_{REF}$, and the difference increases as the input signal becomes greater. In such a condition, when the power operates over a wide range (AC input voltage ranges from 90 Vac to 264 Vac), the protection voltage may vary obviously, and the output powers for the high input voltage and the low input voltage will be largely distinct from each other.

SUMMARY OF THE INVENTION

It is therefore a primary objective of the claimed invention to provide an overcurrent protection device for a power supply device and related power supply device.

The present invention discloses a power supply device with overcurrent protection, the power supply device includes an input stage for filtering and rectifying an input signal in order to generate a first power signal, a transformer having a primary side circuit coupled to the input stage and a secondary side circuit for transforming the first power signal into a second power signal, a power switch coupled to the primary side circuit, a current sensing unit coupled to the power switch for detecting currents passing through the primary side circuit of the power switch in order to generate a current sensing signal, an output stage coupled to the transformer for outputting the second power signal to a load, and an overcurrent protection device coupled to the current sensing unit and the power switch, the overcurrent protection device includes a receiving end for receiving the current sensing signal, a compensating current unit coupled to the receiving end for compensating the current sensing signal in order to generate a current sense compensation signal, a first reference voltage generator for generating a first reference voltage, a comparator coupled between the compensating current unit and the first reference voltage generator for comparing the current sense compensation signal with the first reference voltage in order to generate a comparison result, and a control unit coupled to the comparator and the power switch for controlling an on/off status of the power switch according to the comparison result.

The present invention discloses an overcurrent protection device for a power supply device, the overcurrent protection device includes a receiving end for receiving a current sensing signal, a compensating current unit coupled to the receiving end for compensating the current sensing signal in order to generate a current sense compensation signal, a first reference voltage generator for generating a first reference voltage, a comparator coupled between the compensating current unit and the first reference voltage generator for comparing the current sense compensation signal with the first reference voltage in order to generate a comparison result, and a control unit coupled to the comparator for controlling an on/off status of a power switch of the power supply device according to the comparison result These and other objectives of the present invention will no doubt become obvious to those of ordinary skill in the art after reading the following detailed description of the preferred embodiment that is illustrated in the various figures and drawings.

DETAILED DESCRIPTION

Figure 1:
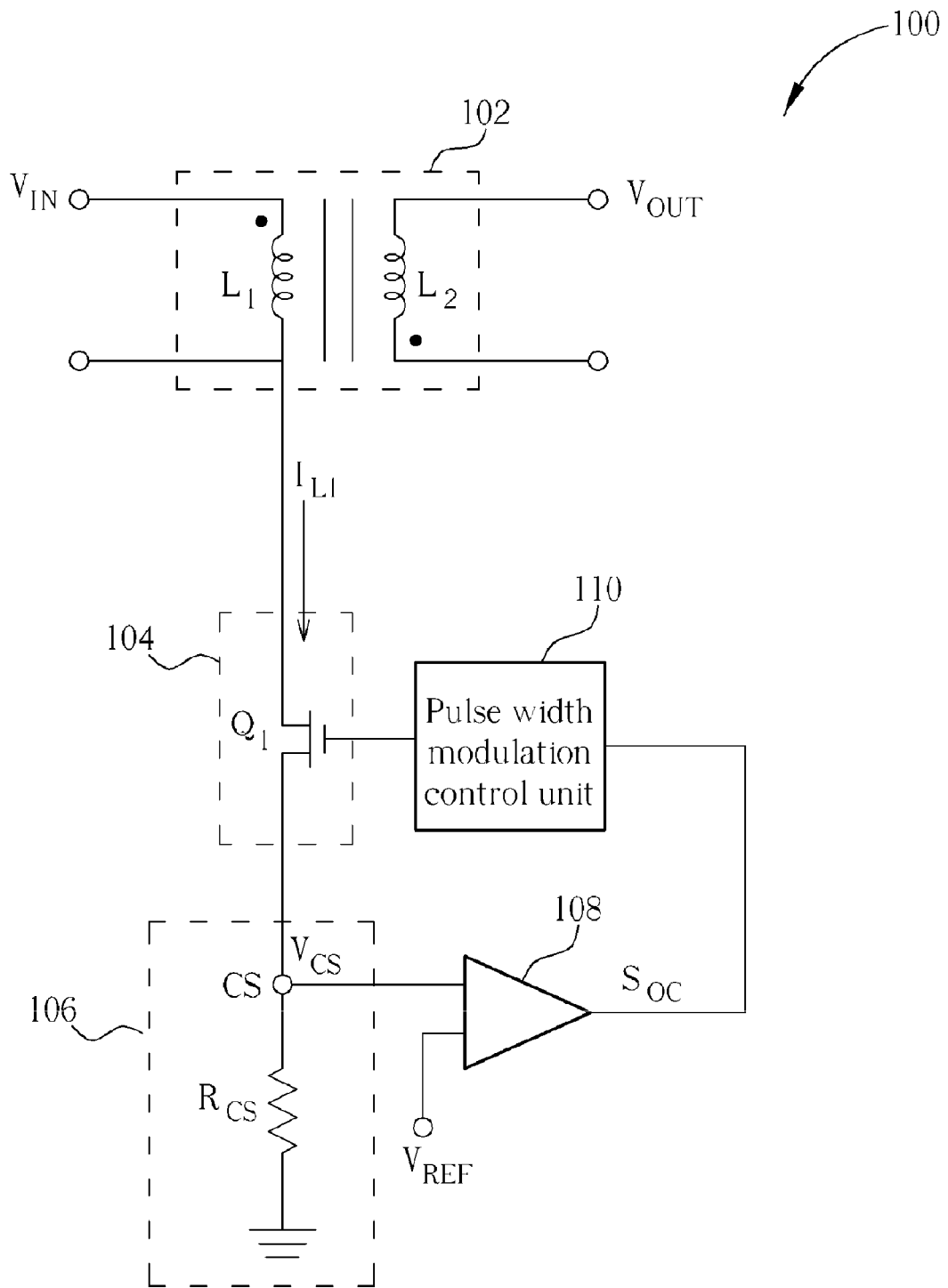
FIG. 1 is a schematic diagram of a power supply in the prior art.
Figure 2:
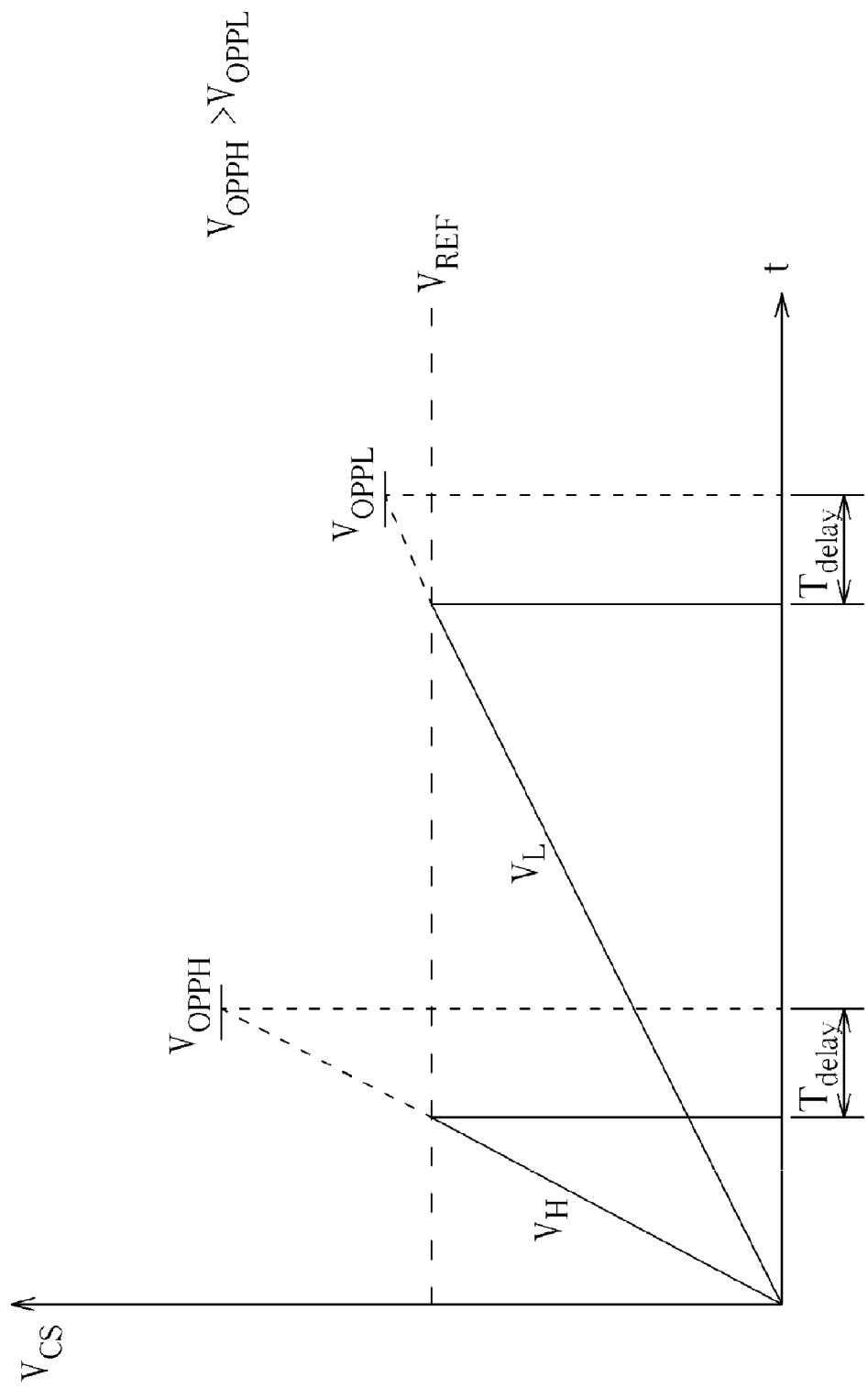
FIG. 2 is a schematic diagram of protection voltages difference for different input voltage due to propagation delay.
Figure 3:
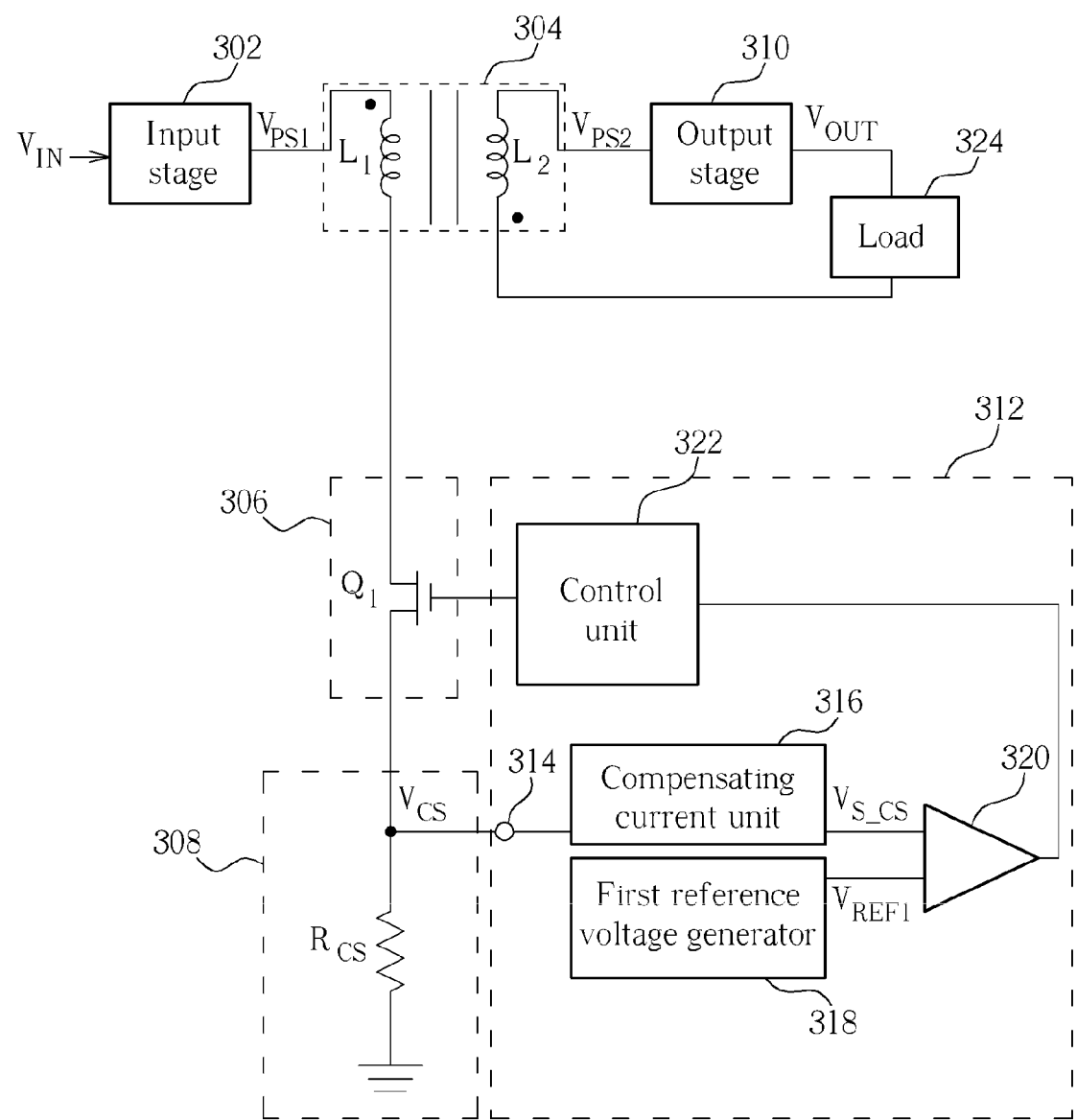
FIG. 3 is a schematic diagram of a power supply according to an embodiment of the present invention.

Please refer to FIG. 3. FIG. 3 is a schematic diagram of a power supply 300 according to an embodiment of the present invention. The power supply 300 includes an input stage 302, a transformer 304, a power switch 306, a current sensing unit 308, an output stage 310, and an overcurrent protection device 312. The input stage 312 is utilized for filtering and rectifying an input signal $V_{IN}$ in order to generate a first power signal $V_{PS1}$. The transformer 304 is coupled to the input stage 302, which has a primary side circuit $L_1$ and a secondary side circuit $L_2$. The transformer 304 is utilized for transforming the first power signal $V_{PS1}$ into a second power signal $V_{PS2}$. The power switch 306 is coupled to the primary side circuit $L_1$ for switching operation of the transformer 304, which is preferably implemented by a power transistor. The current sensing unit 308 is coupled to the power switch 306 for detecting currents passing through the primary side circuit $L_1$ of the power switch 306 in order to generate a current sensing signal $V_{CS}$, which is preferably implemented by a resistor $R_{CS}$. The output stage 310 is coupled to the transformer 304 for outputting the second power signal $V_{PS2}$ to a load. The overcurrent protection device 312 is coupled to the power switch 306 and the current sensing unit 308 for monitoring whether a current $I_{L1}$ of the primary side is within the protected range. While the current $I_{L1}$ is greater than the protected range, the power switch 306 will be turned off for performing overcurrent protection.

Figure 4:
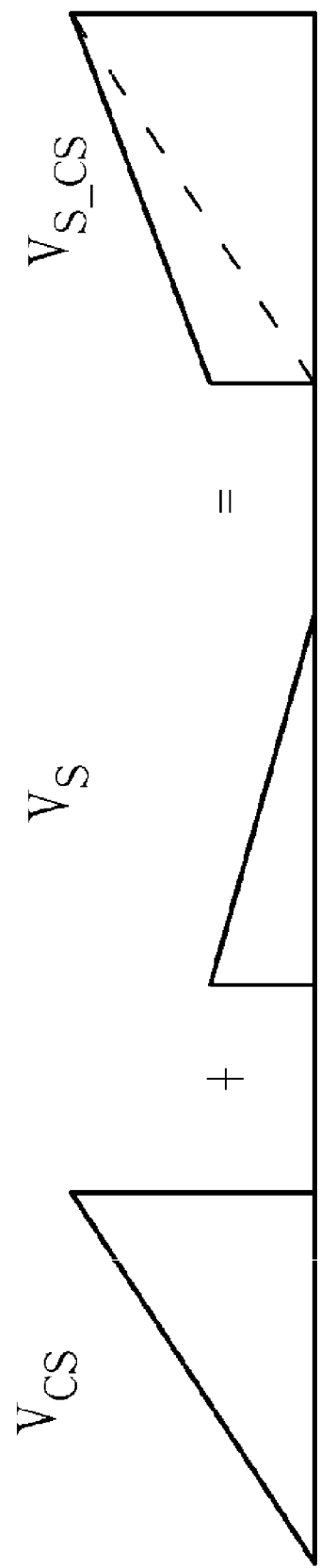
FIG. 4 is a schematic diagram of a current sensing signal within the compensating current unit shown in FIG. 3 according to an embodiment of the present invention.
Figure 5:
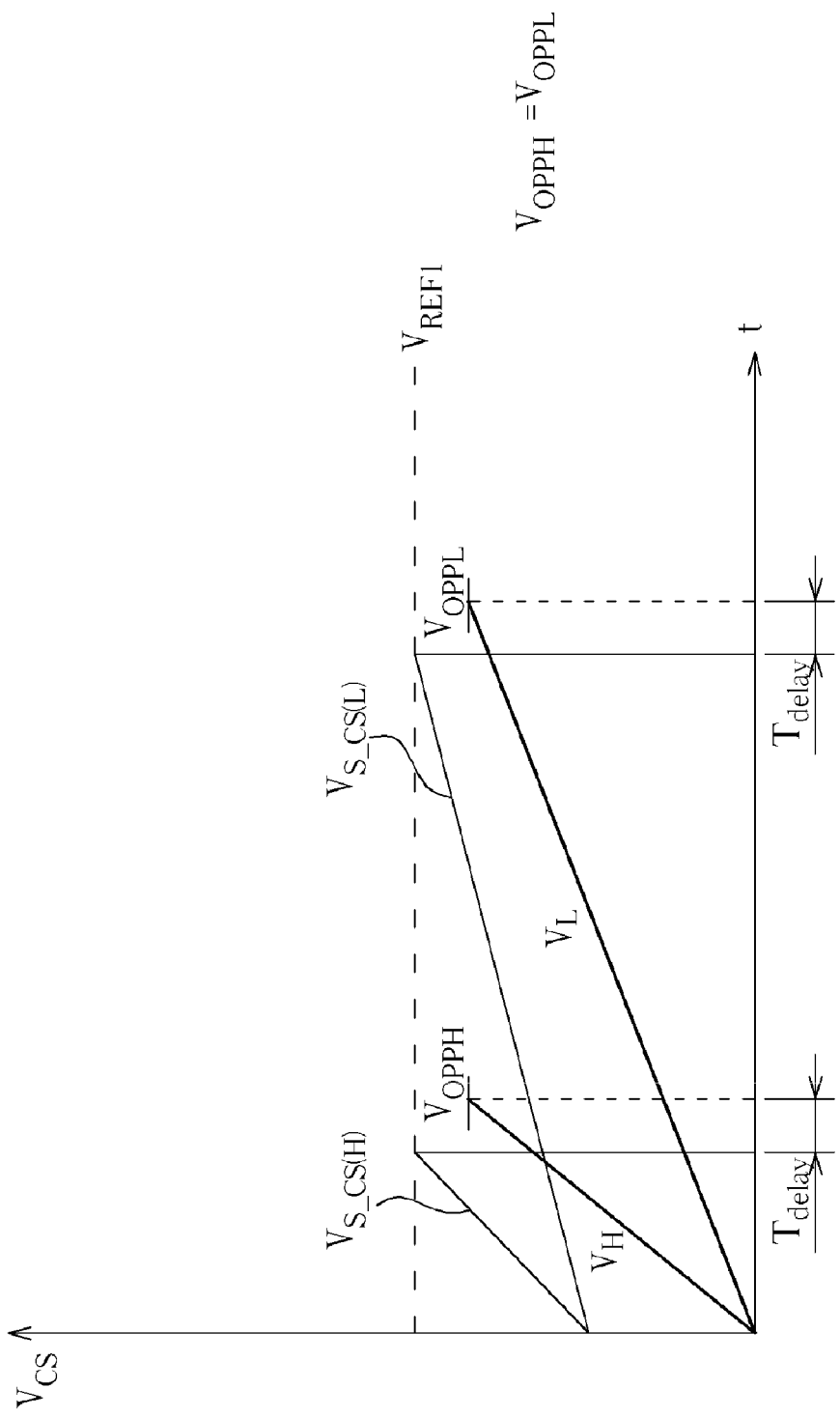
FIG. 5 is a schematic diagram of the protection voltage improvement of the overcurrent protection device for the propagation delay according to an embodiment of the present invention.

Regarding structure and operation of the overcurrent protection device 312 shown in FIG. 3, the overcurrent protection device 312 includes a receiving end 314, a compensating current unit 316, a first reference voltage generator 318, a comparator 320, and a control unit 322. The receiving end 314 is coupled to the current sensing unit 308 for receiving the current sensing signal $V_{CS}$. The compensating current unit 316 is coupled to the receiving end 314 for compensating the current sensing signal $V_{CS}$ in order to generate a current sense compensation signal $V_{S\_CS}$. The first reference voltage generator 318 is utilized for generating a first reference voltage $V_{REF1}$. The comparator 320 is coupled between the compensating current unit 316 and the first reference voltage generator 318 for comparing the current sense compensation signal $V_{S\_CS}$ with the first reference voltage $V_{REF1}$ in order to generate a comparison result. The control unit 322 is coupled to the comparator 320 and the power switch 306 for controlling an on/off status of the power switch 306 according to the comparison result Please further refer to FIG. 4. FIG. 4 is a schematic diagram of the current sensing signal $V_{CS}$ within the compensating current unit 316 shown in FIG. 3 according to an embodiment of the present invention. As shown in FIG. 4, a slope compensation operation is used on the current sensing signal $V_{CS}$ to add the current sensing signal $V_{CS}$ to a compensation signal $V_S$. Then, the current sense compensation signal $V_{S\_CS}$ is obtained. The current sense compensation signal $V_{S\_CS}$ can be utilized for switching in advance. Please further refer to FIG. 5. FIG. 5 is a schematic diagram of the protection voltage improvement of the overcurrent protection device 312 for the propagation delay according to an embodiment of the present invention. Propagation delay time $T_{delay}$ is the same for each input voltage. As shown in FIG. 5, a high input voltage $V_H$ and a low input voltage $V_L$ both with slope compensation (i.e. $V_{S\_CS(H)}$, $V_{S\_CS(L)}$) are capable of reaching the first reference voltage $V_{REF1}$ in advance, so that the power supply 300 can save power during the propagation delay time $T_{delay}$. There are also identical voltages for the overcurrent limit under the high input voltage $V_H$ and the low input voltage $V_L$.

Figure 6:
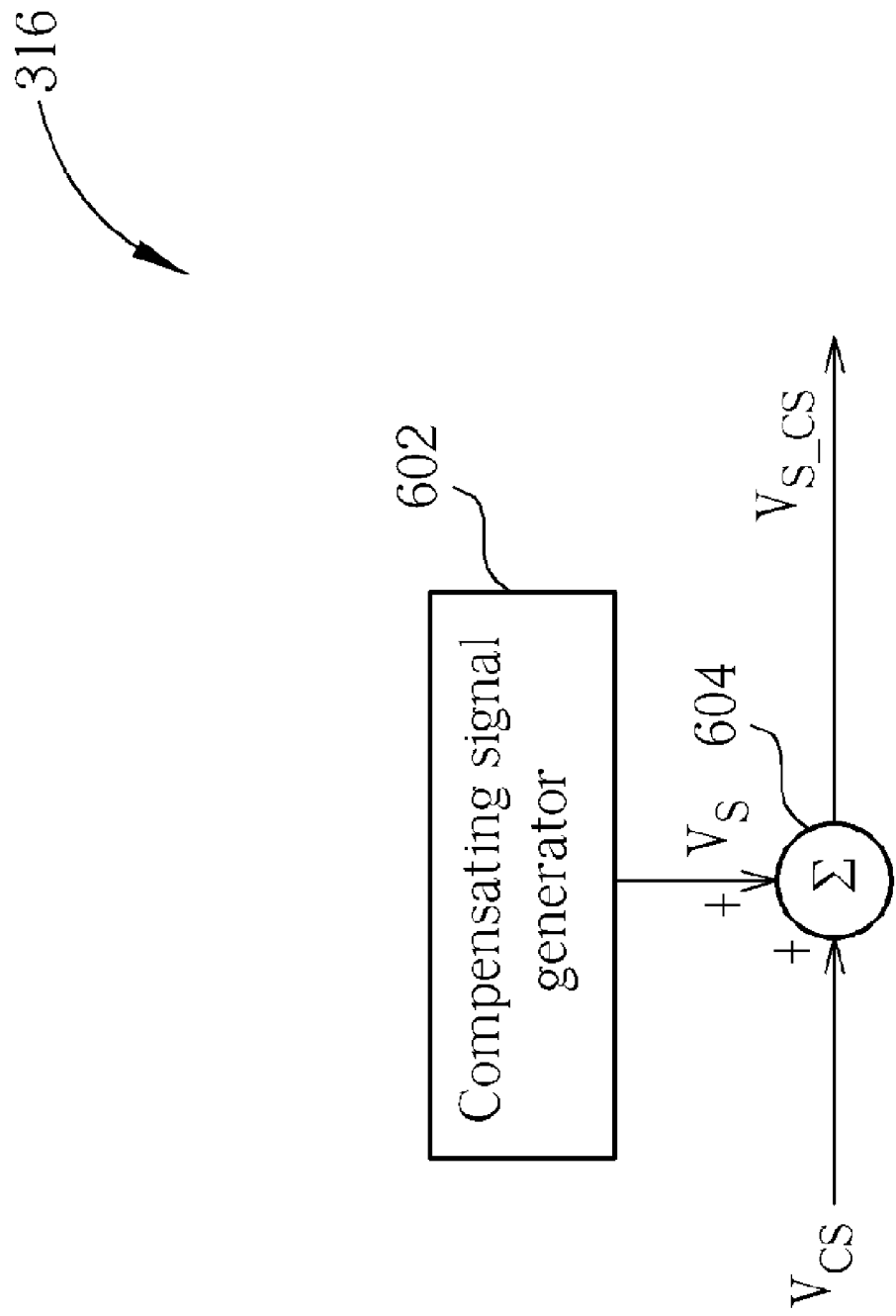
FIG. 6 is a schematic diagram of a compensating current unit shown in FIG. 3 according to a preferred embodiment of the present invention.

Note that FIG. 3 is a schematic diagram according to an exemplary embodiment of the present invention, and those skilled in the art can make alternations and modifications accordingly. For example, please refer to FIG. 6. FIG. 6 is a schematic diagram of the compensating current unit 316 shown in FIG. 3 according to a preferred embodiment of the present invention. Regarding operation of the compensating current unit 316, the compensating current unit 316 includes a compensating signal generator 602 and an adder 604. The compensating signal generator 602 is utilized for generating a compensation signal $V_S$ shown in FIG. 4, and the adder 604 is coupled to the compensating signal generator 602, the receiving end 314, and the comparator 320 for performing an addition operation between the current sensing signal $V_{CS}$ and the compensation signal $V_S$ to generate the current sense compensation signal $V_{S\_CS}$.

In FIG. 6, the compensating signal generator 602 is utilized for generating a compensation signal $V_S$ in order to compensate slope of the current sensing signal $V_{CS}$ and is not limited in any circuit or device. For example, please refer to FIG. 7.

Figure 7:
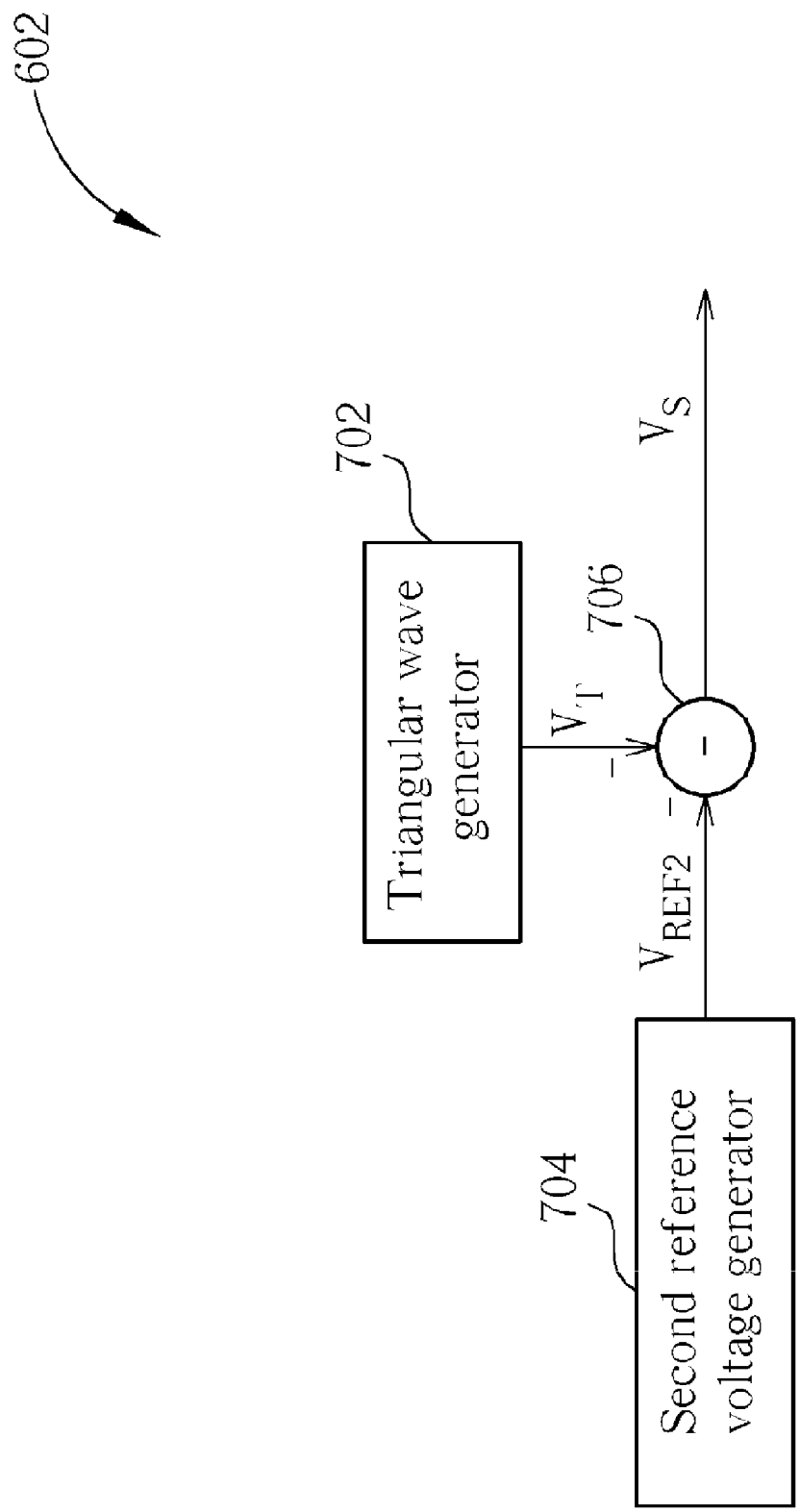
FIG. 7 is a schematic diagram of a compensating signal generator shown in FIG. 6 according to a preferred embodiment of the present invention.

FIG. 7 is a schematic diagram of the compensating signal generator 602 shown in FIG. 6 according to a preferred embodiment of the present invention. The compensating signal generator 602 includes a triangular wave generator 702, a second reference voltage generator 704, and a subtractor 706. The triangular wave generator 702 is utilized for generating a triangular wave signal $V_T$ (or an oscillation signal). The second reference voltage generator 704 is utilized for generating a second reference voltage $V_{REF2}$. The subtractor 706 is coupled to the triangular wave generator 702, the second reference voltage generator 704, and the adder 604 for performing a subtraction operation between the triangular wave signal $V_T$ and the second reference voltage $V_{REF2}$ to generate the compensation signal $V_S$.

In summary, the present invention can achieve slope compensation on the input signal of the power supply, such that the power supply can save power during propagation delay time. Moreover, the present invention can achieve identical voltages for the overcurrent limit corresponding to each input voltage so as to improve the protection voltage difference.

Those skilled in the art will readily observe that numerous modifications and alterations of the device and method may be made while retaining the teachings of the invention.

What is claimed is:

1. An overcurrent protection device for a power supply device, the overcurrent protection device comprising:
    a receiving end for receiving a current sensing signal;
    a compensating current unit for compensating the current sensing signal in order to generate a current sense compensation signal, the compensating current unit comprising:
        a compensating signal generator for generating a compensation signal, the compensating signal generator comprising:
            a triangular wave generator for generating a triangular wave signal;
            a second reference voltage generator for generating a second reference voltage; and
            a subtractor coupled to the triangular wave generator and the second reference voltage generator for performing a subtraction operation between the triangular wave signal and the second reference voltage to generate the compensation signal; and
        an adder coupled to the subtractor and the receiving end for performing an addition operation between the current sensing signal and the compensation signal to generate the current sense compensation signal;
    a first reference voltage generator for generating a first reference voltage;
    a comparator coupled between the adder and the first reference voltage generator for comparing the current sense compensation signal with the first reference voltage in order to generate a comparison result; and
    a control unit coupled to the comparator for controlling an on/off status of a power switch of the power supply device according to the comparison result.

2. The overcurrent protection device of claim 1, wherein the current sensing signal is provided by a current sensing unit of the power supply.

3. The overcurrent protection device of claim 1, wherein the triangular wave generator is further utilized for providing an oscillation signal.

4. The overcurrent protection device of claim 1, wherein the power supply is a switching power supply.

5. The overcurrent protection device of claim 1, wherein when the comparison result indicates the current sense compensation signal is greater than or equal to the first reference voltage, the control unit enables to turn off the power switch.

6. The overcurrent protection device of claim 1, wherein when the comparison result indicates the current sense compensation signal is less than the first reference voltage, the control unit keeps the power switch on.

7. A power supply device with overcurrent protection, the power supply device comprising:
    an input stage for filtering and rectifying an input signal in order to generate a first power signal;
    a transformer having a primary side circuit coupled to the input stage and a secondary side circuit, for transforming the first power signal into a second power signal;
    a power switch coupled to the primary side circuit;
    a current sensing unit coupled to the power switch for detecting currents passing through the primary side circuit of the power switch in order to generate a current sensing signal;
    an output stage coupled to the transformer for outputting the second power signal to a load; and
    an overcurrent protection device coupled to the current sensing unit and the power switch, the overcurrent protection device comprising:
        a receiving end coupled to the current sensing unit for receiving the current sensing signal;
        a compensating current unit comprising:
            a compensating signal generator for generating a compensation signal, the compensating signal generator comprising:
                a triangular wave generator for generating a triangular wave signal;
                a second reference voltage generator for generating a second reference voltage; and
                a subtractor coupled to the triangular wave generator and the second reference voltage generator for performing a subtraction operation between the triangular wave signal and the second reference voltage to generate the compensation signal; and
            an adder coupled to the subtractor and the receiving end for performing an addition operation between the current sensing signal and the compensation signal to generate a current sense compensation signal;
        a first reference voltage generator for generating a first reference voltage;
        a comparator coupled between the adder and the first reference voltage generator for comparing the current sense compensation signal with the first reference voltage in order to generate a comparison result; and
        a control unit coupled to the comparator and the power switch for controlling an on/off status of the power switch according to the comparison result.

8. The power supply of claim 7, wherein the triangular wave generator is further utilized for providing an oscillation signal.

9. The power supply of claim 7, wherein the power supply is a switching power supply.

10. The power supply of claim 7, wherein when the comparison result indicates the current sense compensation signal is greater than or equal to the first reference voltage, the control unit enables to turn off the power switch.

11. The power supply of claim 7, wherein when the comparison result indicates the current sense compensation signal is smaller than the first reference voltage, the control unit keeps the power switch on.

12. The power supply of claim 7, wherein the power switch is a power transistor.

* * * * *